United States Patent
Kraft et al.

(10) Patent No.: US 7,020,273 B2
(45) Date of Patent: Mar. 28, 2006

(54) COMMUNICATION TERMINAL PROVIDED FOR A USER SELECTED DISTORTION OF AN ACOUSTIC INPUT

(75) Inventors: Christian Kraft, Hvidovre (DK); Keijo Virtanen, Tampere (FI)

(73) Assignee: Nokia Corporation, Espoo (FI)

( * ) Notice: Subject to any disclaimer, the term of this patent is extended or adjusted under 35 U.S.C. 154(b) by 513 days.

(21) Appl. No.: 09/993,664

(22) Filed: Nov. 27, 2001

(65) Prior Publication Data

US 2003/0099344 A1 May 29, 2003

(51) Int. Cl.
H04M 1/00 (2006.01)

(52) U.S. Cl. .................. 379/387.01; 455/3.06

(58) Field of Classification Search .......... 379/110.01, 379/406.03, 406.15, 387.01, 387.02; 455/3.06; 387/61, 63; 370/276; 704/270, 72, 78
See application file for complete search history.

(56) References Cited

U.S. PATENT DOCUMENTS

| | | | | |
|---|---|---|---|---|
| 5,559,792 A | * | 9/1996 | Bottoms et al. | 370/276 |
| 5,802,164 A | * | 9/1998 | Clancy et al. | 379/347 |
| 6,148,175 A | * | 11/2000 | Freedland | 455/3.06 |

FOREIGN PATENT DOCUMENTS

| | | |
|---|---|---|
| GB | 2 313 981 | 12/1997 |
| WO | 99/18684 | 4/1999 |
| WO | 99/33076 | 7/1999 |

* cited by examiner

Primary Examiner—Sinh Tran
Assistant Examiner—Walter F Briney, III
(74) Attorney, Agent, or Firm—Alston & Bird LLP (57) ABSTRACT

The invention relates to a communication terminal provided which selectively distorts an acoustic signal inputted by the user to the communication terminal during a call to another user of a communication terminal. The invention enables a user of a first communication terminal to selectively distort an acoustic signal inputted into the first communication terminal during a call with a user of a second communication terminal, where the method includes that the user of the first communication terminal inputs an acoustic signal. A processor in the first communication terminal distorts the signal according to a selection in the first communication terminal, where the selection is user defined or selected. The processor transfers the distorted signal and transmits the signal via a communication network to the second communication terminal, where a processor of the second communication terminal receives the distorted signal and uses the distorted signal as output acoustic signal in the second communication terminal to the user of the second communication terminal.

16 Claims, 13 Drawing Sheets

COMMUNICATION TERMINAL PROVIDED FOR A USER SELECTED DISTORTION OF AN ACOUSTIC INPUT

BACKGROUND OF THE INVENTION

1. Field of the Invention

The invention relates to a communication terminal provided permitting a user to selectively distort an acoustic signal inputted by the user to the communication terminal during a call to another user of a communication terminal.

2. Description of Prior Art

In the development of mobile communication there is a trend towards more personalized ways of communication and expression forms. An example of this is the short message service (SMS), chat, picture messaging, animations, ringing tunes, operator logos, vibrations, exchangeable covers and picture holders for personal pictures. Users have however found out that there are some limitations with these features, and have been looking for something more advanced. In the communication between the young there is often used different kinds of fantasy-languages or other peculiar ways of addressing each other.

SUMMARY OF THE INVENTION

The invention provides a communication terminal permitting a user to distort an inputted acoustic signal during a call with a user of another communication terminal.

An object of the invention is to provide a method for enabling personalized communication between users of communication terminals.

According to a first preferred embodiment of the invention this objective is obtained by a method of enabling a user of a first communication terminal to selectively distort an acoustic signal inputted into the first communication terminal during a call with a user of a second communication terminal.

Another object of the invention is to provide a method for enabling a user to personalize the communication between users of communication terminals.

According to a second preferred embodiment of the claimed invention, this objective is obtained by a method for enabling a user of a first communication terminal to selectively distort an acoustic signal inputted into the first communication terminal during a call with a user of a second communication terminal, where the method includes that the user of the first communication terminal inputs an acoustic signal. A processor in the first communication terminal distorts the signal according to a selection in the first communication terminal, where the selection is user defined or selected. The processor transfers the distorted signal and transmits the signal via a communication network to the second communication terminal, where a processor of the second communication terminal receives the distorted signal and uses the distorted signal as output acoustic signal in the second communication terminal to the user of the second communication terminal.

A third object of the invention is to provide a communication terminal which enables personalized communication between user of communication terminals.

According to a third preferred embodiment of the invention, this objective is obtained by a communication terminal having input and output interfaces provided with means for distorting an acoustic signal, where the communication terminal includes a processor for distortion of an acoustic signal inputted from a user, and where the distortion is made according to a user selected setting of the distortion in the communication terminal. The communication terminal has a user interface, where the user can select the distortion settings and where the processor transmits the distorted signal to a second communication terminal.

BRIEF DESCRIPTION OF THE DRAWING

The invention will be explained more fully below, by way of example, in connection with preferred embodiments and with reference to the drawing, in which.

DETAILED DESCRIPTION OF THE INVENTION

Figure 1:
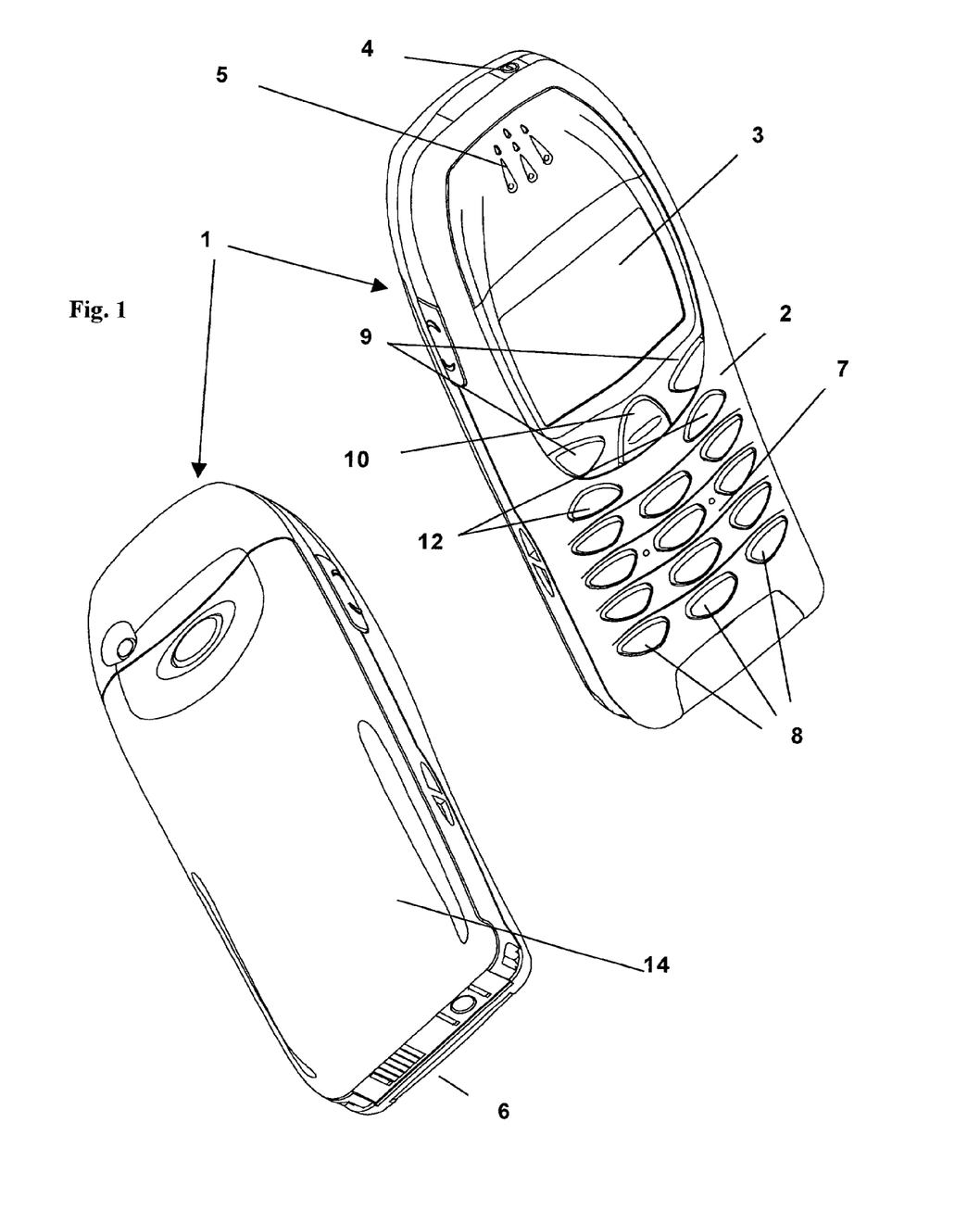
FIG. 1 shows in a perspective view a known embodiment of a communication terminal.

According to a first aspect of the invention, distorting of an inputted acoustic signal during a call with a user of another communication terminal according to the invention is described with reference to a hand portable phone, preferably a cellular/mobile phone. An embodiment of this phone is shown in FIG. 1, where a cellular/mobile phone 1 is shown in perspective. The phone is provided with a front cover 2 having a window frame 3 encircling the protection window of the display assembly 3. The cellular/mobile phone comprises a user interface having an on/off button 4, a speaker 5 (only openings are shown), a keypad 7, a battery 14, a display/LCD 3 and a microphone 6 (only openings are shown).

The keypad 7 has a first group of keys 8 as alphanumeric keys, by means of which the user can enter a telephone number, write a text message (SMS), write a name (associated with the phone number), etc. Each of the twelve alphanumeric keys 8 is provided with a numeral "0–9" or a sign "#" or "*", respectively. In alpha mode each key is associated with a number of letters and special signs used in the text editing.

The keypad 7 additionally comprises two menu selections or soft-keys 9, two call handling keys 12, and a navigation-key 10. The functionality of the soft-key 9 depends on the state of the phone and the navigation in the menu by using a navigation-key. The present functionality of the menu selection keys 9 is shown in separate fields in the display 3 just above the keys 9. The two call handling keys 12 are used for establishing a call or a conference call, terminating a call or rejecting an incoming call. This key layout is characteristic of e.g. the Nokia 6210™ phone.

The navigation-key 10 is an up/down key and is placed centrally on the front surface of the phone between the display 3 and the group of alphanumeric keys 8. Hereby the user is able to control this key with the user's thumb. This is the best site to place an input key requiring precise motor movements. Many experienced phone users are used to one-hand handling. They place the phone in the hand between the fingertips and the palm of the hand. Hereby the thumb is free for inputting information.

Figure 2:
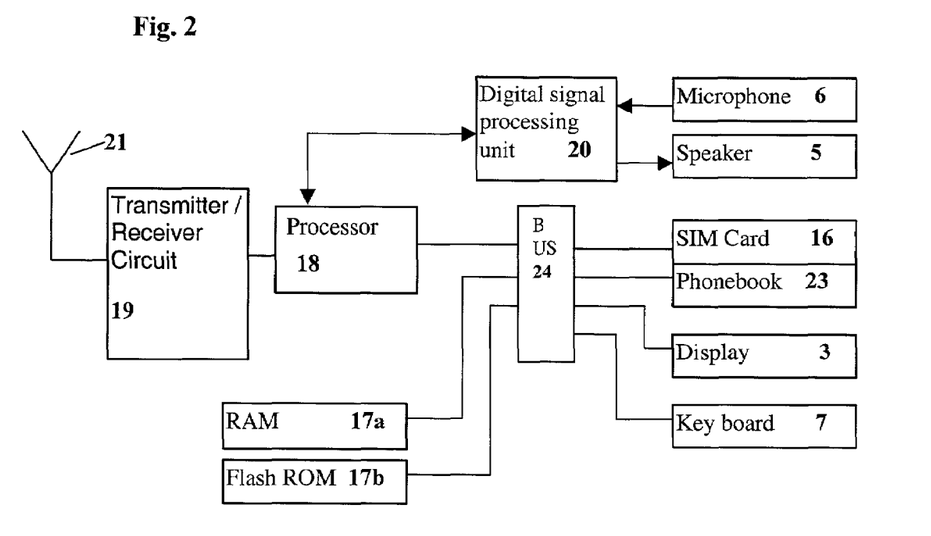
FIG. 2 schematically shows the essential parts of a telephone for communication with a cellular network.

FIG. 2 schematically shows the most important parts of a preferred embodiment of the phone/terminal, the parts being essential to the understanding of the invention. The microphone 6 records the user's speech, and the analog signals formed thereby are A/D converted in an A/D converter (not shown) before the speech is encoded in an audio part 20. The encoded speech signal is transferred to a processor 18 (physical layer processor), which e.g. supports GSM terminal software. The processor 18 also forms the interface to the peripheral terminals of the apparatus, including RAM and ROM memories 17a and 17b, a SIM card 16, the display 3 and the keypad 7 (from FIG. 1) as well as data, power supply, etc. The processor 18 controls the communication with the network via the transmitter/receiver circuit 19 and an antenna 21. The audio part 20 speech-decodes the signal, which is transferred from the processor 18 to the speaker 5 via a D/A converter (not shown).

The processor 18 is via a bus 24 connected to a RAM memory 17a and a Flash ROM memory 17b, a SIM card 16, the display 3 and the keypad 7 (as well as data, power supply, etc.). A phonebook 23 is furthermore connected to the processor 18 via the bus 24. The phonebook 23 may be stored on the SIM card 16, and/or in the Flash ROM memory 17a.

The processor 18 is connected to the user interface of the mobile phone. Thus, it is the processor 18, which monitors the activity in the phone and controls the display 3 in response thereto.

Therefore, it is the processor 18, which detects the occurrence of a state change event and changes the state of the phone and thus the display text. The user may cause a state change event, when he/she activates the keypad 7 including the menu selection key or keys 9, and these types of events are called entry events or user events. However, the network communicating with the communication terminal may also cause a state change event. These types of events and other events beyond the user's control are called non-user events. Non user events comprise status change during call set-up, change in battery voltage, change in antenna conditions, message on reception of SMS, etc.

Figure 3A:
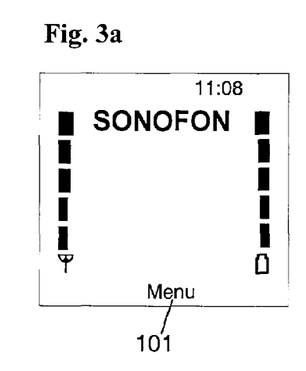
FIGS. 3a–3c show different displays of communication terminals having different number of soft-keys.
Figure 3B:
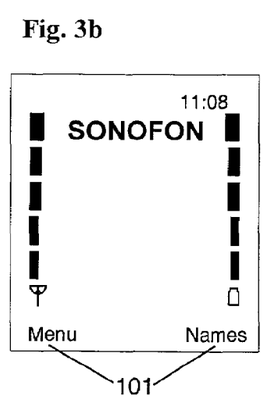
Figure 3C:
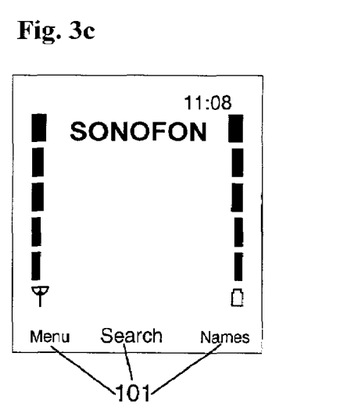

The functionality of distortion of an acoustic signal in a communication terminal is basically included in the menu structure and will be explained in connection with the menu structure. The starting point in each embodiment is idle mode, which means that the communication terminal is turned on and ready to be used for any possible operation. The idle mode display will differ from embodiment to embodiment depending on the number of soft-keys 9 that are used in each embodiment. In the illustrated embodiments, the communication terminal has two soft-keys, but it is obvious that communication terminals having one, three or more soft-keys can also be provided with the functionality of distortion of an acoustic signal in a communication terminal according to the invention. In FIGS. 3a–3c, the idle mode displays of communication terminals having different numbers of soft-keys have been shown. The other displays (not shown) of the communication terminal having a different number of soft-keys will also be changed accordingly to suit the inventive concept.

Figure 4:
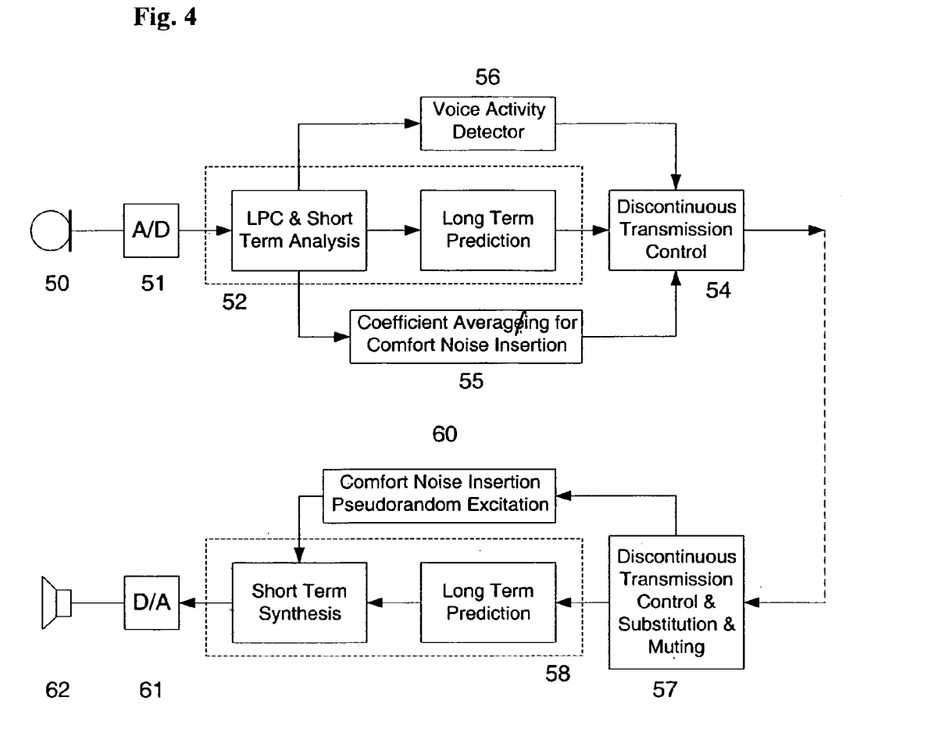
FIG. 4 shows the general principles of speech encoding and decoding in a GSM system.

In FIG. 4, the general principles of speech encoding and decoding in a GSM system is shown. In the GSM specification (06.10) is specified the bit-exact algorithms for encoding and decoding. An acoustic signal is transcoded to an analog signal in the microphone 50 of a communication terminal. The analog signal is thereafter converted to a digital signal in the A/D-converter 51, and inputted into a speech encoder 52, where the signal is sampled, filtered, compressed etc. to be transmitted via a network/RF channel to a receiving communication terminal. The process also includes a voice activity detector 56, a comfort noise generator 55 for averaging the background noise so that it is continuous and a discontinuous transmission control 54 for adjusting the efficiency of the speech encoder to the presence of information to be transmitted. After the signal has been received at the receiving communication terminal the signal will be sampled, filtered, expanded etc. in a speech decoder 58, whereafter it is converted to an analog signal in a D/A-converter 61 and be made to sound in a speaker 62. The receiving communication terminal also has means for adapting for background noise 60 and discontinuous transmission 57.

Figure 5:
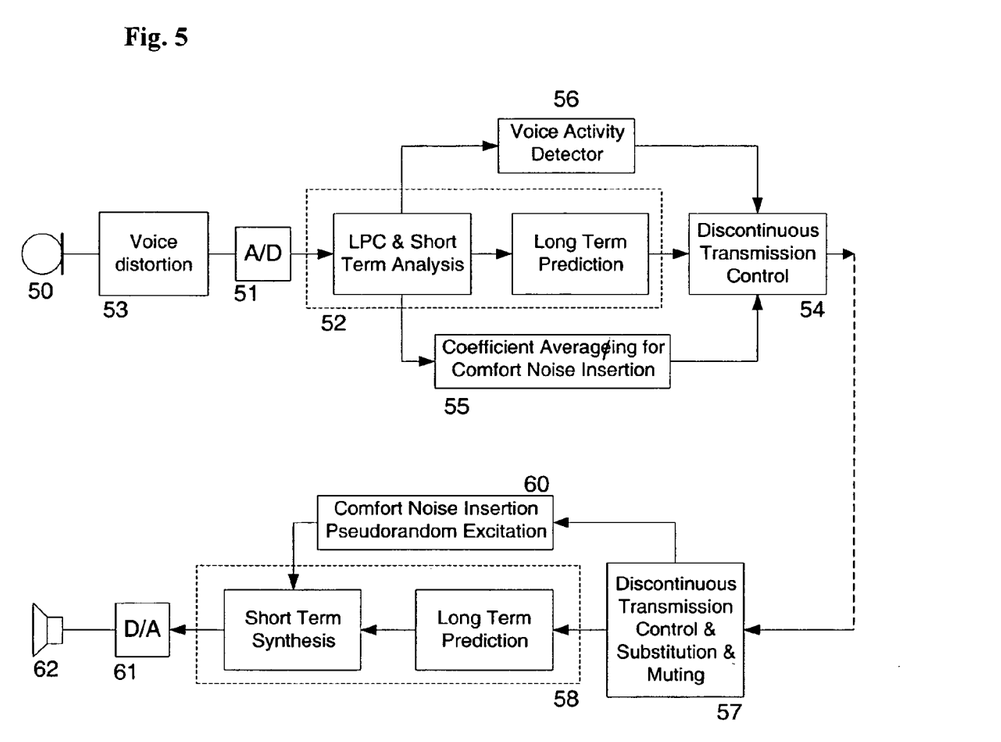
FIG. 5 shows a first embodiment having analog voice distortion according to the invention.

In FIG. 5, a first preferred embodiment is shown, where a voice distortion unit 53 has been included in the speech encoding of an acoustic signal inputted to the microphone 50. The voice distortion unit 53 is analog and includes filters to distort the acoustic signal in a preferred way. After the acoustic signal has been distorted in the voice distortion unit 53, the acoustic signal is speech encoded in the normal way.

Figure 6:
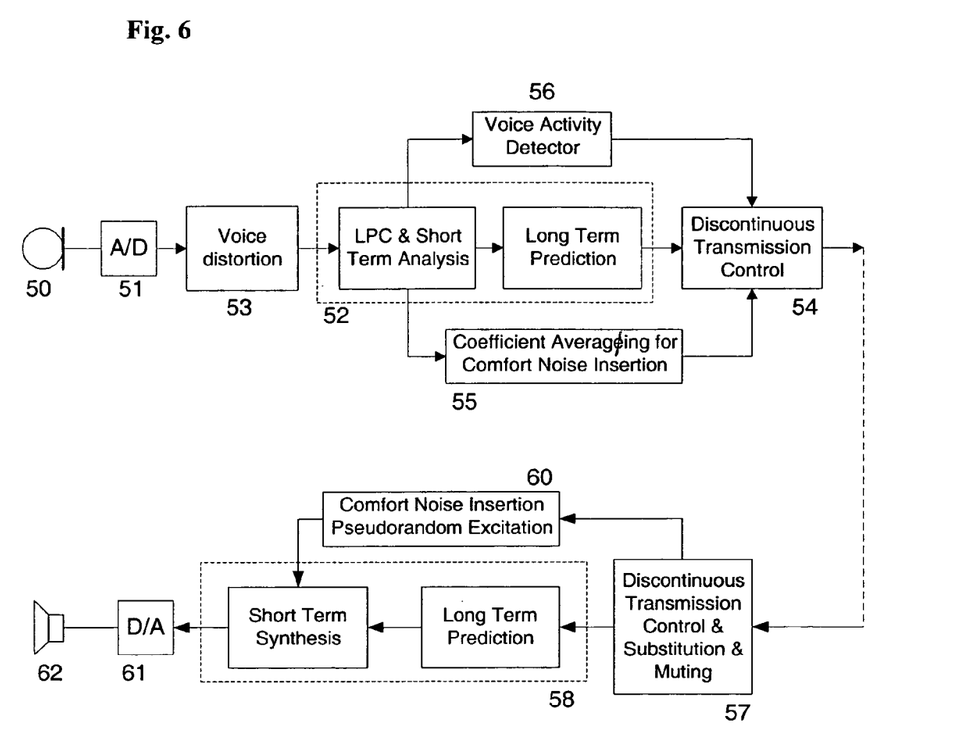
FIG. 6 shows a second embodiment having separate digital voice distortion according to the invention.

In FIG. 6, a second preferred embodiment is shown where a digital voice distortion unit 53 has been included in the speech coding of the acoustic signal. The digital voice distortion unit 53 differs from the analog voice distortion unit in that the distortions of the acoustic signal are more freely varied. The digital voice distortion unit 53 could be a digital signal processor of known type.

Figure 7:
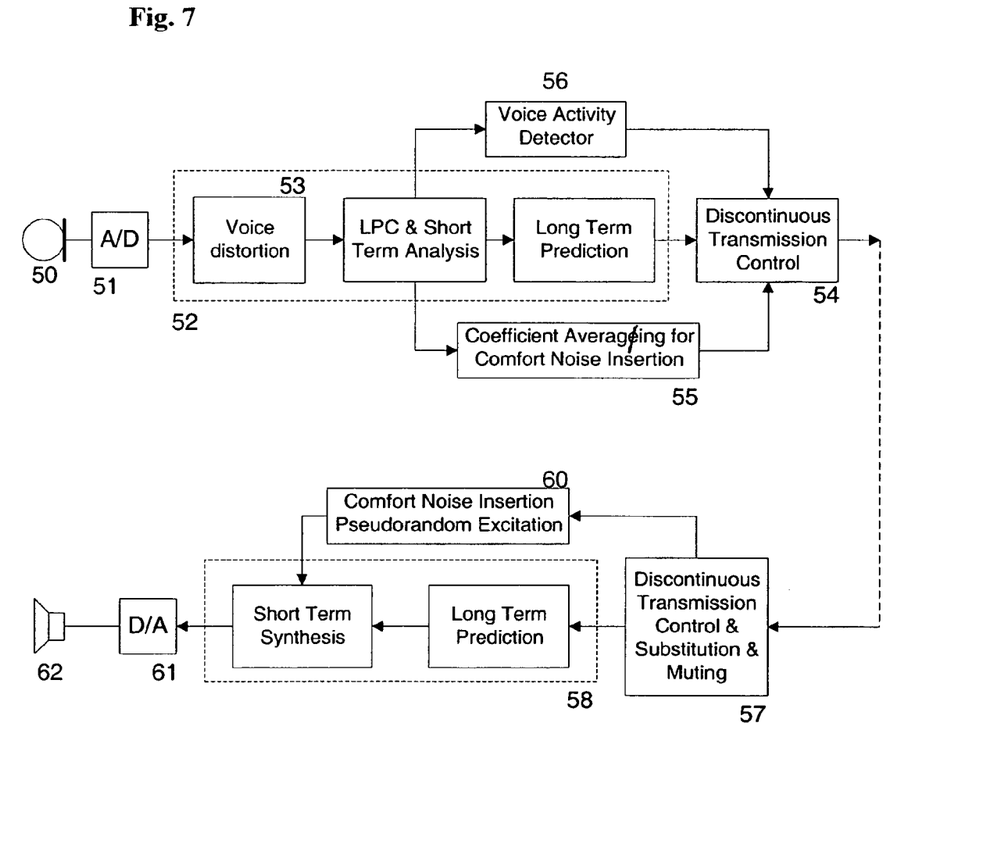
FIG. 7 shows a third embodiment having digital voice distortion incorporated in the speech encoder according to the invention.

In FIG. 7, a third preferred embodiment is shown where the digital voice distortion unit 53 has been incorporated in the speech encoder unit 52.

The distortion can be made according to many different algorithms or methods. A simple distortion method is using low-or high pass filters, where the speech has been cut-off above or below a certain frequency. Other examples could be adding an echo, add simulated background noise, removing background noise etc. The speech can also be distorted by using more advanced algorithms like Fourier or Doppler transformation giving a rather strange speech.

In the drawings, a couple examples of distortion profiles have been used like Donald Duck, Robot, Lower and higher, but there is no end to what kind of profiles that can be used. Different celebrities, Disney characters, other movie characters, animal sounds, human sounds, dialects, artists etc are also obvious material that can be used for creating distortion profiles.

Figure 8:
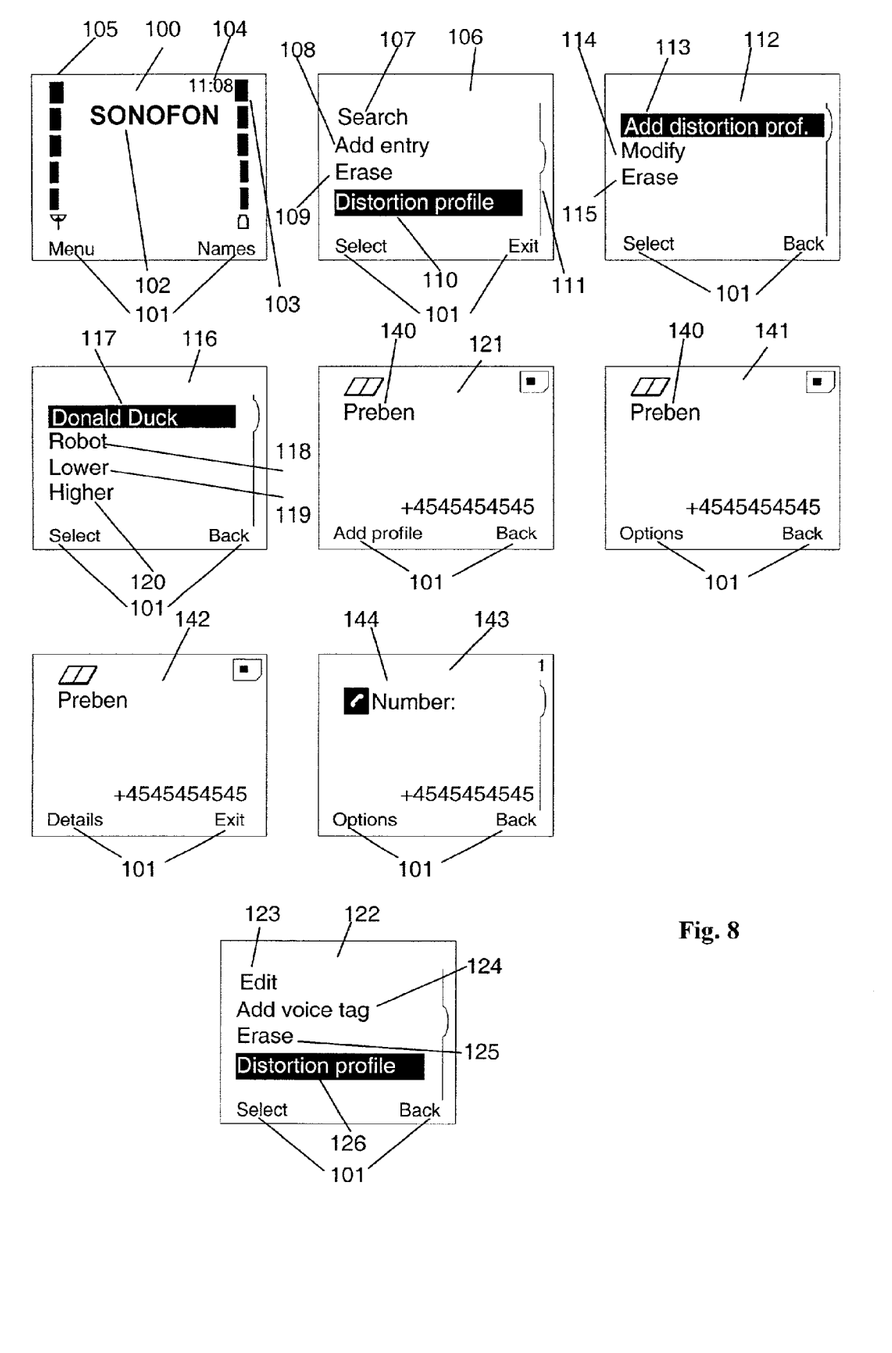
FIGS. 8–11 show different windows of the display of a communication terminal having means for distorting an acoustic signal according to the invention.

In FIG. 8 is shown an idle display 100 for the communication terminal or phone 1, which includes two bars indicating the signal strength 105 and the battery level 103. Furthermore there is a time indication 104, an identification 102 of the operator or the network to which the phone 1 is presently connected, and two labels 101 indicating the present functionality (Menu: access to the Menu structure; Names: access to the Phonebook) of the two soft-keys 9.

In idle mode the user can access the phonebook options by pressing the right soft-key 9 "Names" (shown in FIG. 8), step 220, and a display 106 will appear including a list of options 107–110, step 221. These are the options in the phonebook 23. There are more options available by scrolling up or down in the list with the navigation-key 10. The display 106 also includes an indicator line 111 in the display's right part that indicates with a bend on the line, where a highlighted option 110 is located in the list. The highlighted option 110 "Distortion profile" can be selected by pressing the soft-key 9 "Select", step 222, whereafter a display 112 will appear indicating with a list a number of options 113–115, step 223. These options can be selected by scrolling up or down in the list until a desired option is highlighted, and pressing the left soft-key 9 "Select" to execute the selection. If instead the right soft-key 9 "Back" is pressed, the terminal is returned to the previous display 106. The terminal is also returned to the previous display, Idle mode, if the right soft-key 9 "Exit" is pressed when display 106 is shown, step 236.

The first option 113 "Add distortion prof.", in display 112, is used to add a distortion profile to an entry 140 in the phonebook 23. This selection is made by pressing the left soft-key 9 "Select" in display 112, step 224, whereafter a display 116 indicating a list of different distortion profiles 119–120, step 227. There could obviously be more profiles and these can be accessed by scrolling up or down in the list with the navigation-key 10. One of the profiles 117–120, the highlighted one, is selected with the left soft-key 9, step 228, and a display 121 where the first entry 140 is shown. The other entries in the phonebook can be accessed by scrolling up and down with the navigation-key 10 or by using the alphanumeric keys 8 corresponding to the initial letter of the desired phonebook entry 140. In display 121, a single entry 140 is shown, but it could also be a list of entries (not shown). The distortion profile is added to a selected entry 140 by pressing the left soft-key 9 "Select", step 229 and the display 121 changes to appear such as display 141, where the indication 101 of the left soft-key 9 has changed to "Options". With these options (not shown) the user can delete the added profile or change to another profile. If the user scrolls down to the next entry, the left soft-key 9 changes to be as indicated in display 121. If this entry is also selected, step 229, the left soft-key changes to be indicated as in display 141. This means that the user can see by the left soft-key 9 if the entry has a distortion profile added or not. By pressing the left sot-key 9 "Option" as indicated in display 141 the user can see what profile has been added. If instead the left soft-key 9 is selected while being in display 121 the terminal is returned back to display 116, where another distortion profile 117–120 can be selected. The function is ended by pressing the right soft-key "Back" while being in display 112, step 230.

If the second option 114 "Modify" is selected in the list of display 112, step 225, on the display 116, step 227, the previous selected distortion profile 117 is highlighted. A new selection can be made by scrolling up or down to the preferred profile with the navigation-key 10 and executing the selection by pressing the left soft-key 9, "Select", step 231. The communication terminal 1 proceeds to display 106, step 232.

If the third option 115 "Erase" is selected in the list of display 112, step 226, the entries in the phonebook having distortion profiles appear (not shown), step 233. The user can erase the distortion profiles from the entries by pressing the left soft-key 9, step 234. A confirmation display appears (not shown), where the user can confirm that the distortion profile should be deleted from the selected phonebook entry 140. After the distortion profile has been deleted from the selected phonebook entry 140, the terminal proceeds to the next phonebook entry 140 having a distortion profile, step 235. The deletion of the distortion profiles can be continued until the profiles are erased from all phonebook entries, whereafter the terminal proceeds to display 106, step 232.

Another way of adding a distortion profile to a phone entry is to access the entries of the phonebook directly. This is made by pressing the navigation-key 10, step 240, while being in idle mode, display 100. If the navigation-key 10 is pressed a display 142 appears, step 241, indicating the first entry 140 in the phonebook. The entries in the phonebook can as stated earlier be presented as a list as well. The details of the entry can be viewed by pressing the left soft-key 9 "Details", step 242, and a display 143 appears indicating a first detail 144 of the entry 140. If the right soft-key "Exit" is pressed instead the phonebook 23 is closed and the communication terminal proceeds to idle mode, display 100.

To change the entry 140, the left soft-key 9 "Options" is pressed and a display 122 appears, step 243 indicating a list of options 123–126 how to change the entry 140. In the list of display 122, only a couple of options are indicated, more options are shown by scrolling up or down with the navigation-key 10. By pressing the left soft-key 9 "Select", while option 126 is highlighted, the Distortion profile sub-menu is entered, step 244, display 112, where the options 113–115 are indicated, step 245. If the first option 113 "Add distortion prof." is selected, step 246, from the list by pressing the left soft-key 9 "Select", a display 116 appears, step 247, indicating a list of different distortion profiles 119–120 that can be added to the phonebook entry 140. The distortion profile is added to a selected entry 140 by the pressing the left soft-key 9 "Select", step 248, and the terminal proceeds to display 122, step 249. The second option 114 "Modify" is selected, step 250, in a similar way and the display 116 appears, step 251, where present selection 117 is highlighted. A new selection can be made by scrolling up or down to the preferred profile with the navigation-key 10 and executing the selection by pressing the left soft-key 9, "Select", step 252. The communication terminal 1 returns back to display 122 after the selection, step 253. The third option 115 "Erase", is also selected, step 254, while being highlighted. A confirmation display appears, step 255, (not shown) so that the user can confirm that the distortion profile should be erased from the phonebook entry 140. After confirmation the terminal 1 is returns to display 122, step 256. The function is ended by pressing the right soft-key three times.

It is also possible to set a default distortion profile that can easily be selected for call set-up or during a call to user not in the phonebook 23. The settings for distortion profiles can be located in many places in the menu structure, e.g. as main menu directly below idle mode or as a sub-menu in another main menu. The display 127 and 129 (see FIG. 9) gives an example of this. Either menu is selected by pressing the left soft-key 9 "Menu", step 200, in idle mode and using the navigation-key 10 to locate the main menu and making another pressing of left soft-key 9, step 201, when the function is located in a sub-menu. From any of the displays 127 or 129 the function is started, step 202, by pressing the left soft-key 9, "Select", and a display 136 appears, step 203, indicating a list of options 137–139. The first option 137, "Activate", is used to select a default distortion profile, and is selected by pressing the left soft-key 9, "Select", step 204, while the first option 137 is highlighted. A display 131 indicating a list of the distortion profiles 132–135 is shown, step 205. The preferred distortion profile is selected by pressing the left soft-key 9, "OK", step 206, and the terminal returns back to display 127 or 129 respectively, step 207. If the selection is regretted, the right soft-key 9, "Back", can be pressed and the terminal returns to display 136, step 208.

Figure 9:
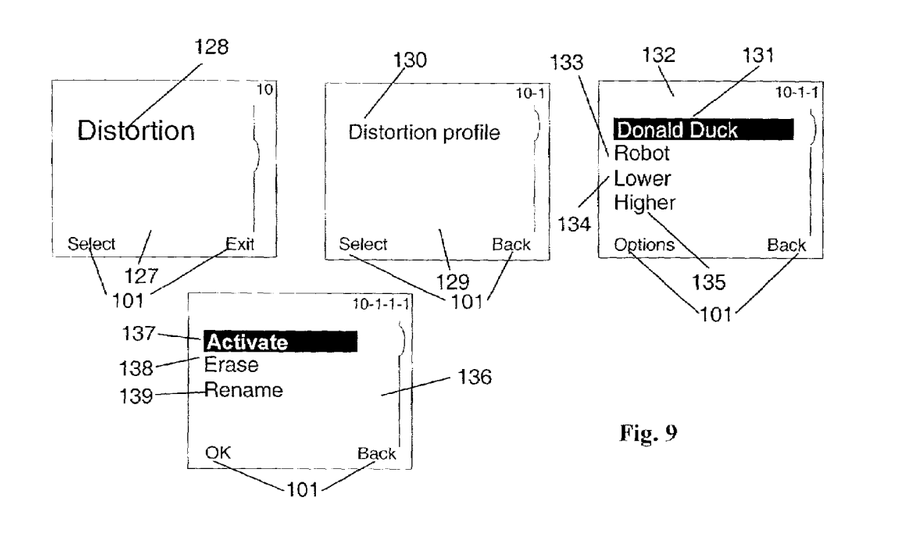

The second option 138, "Erase", is used to delete distortion profiles from the archive. It is activated by pressing the left soft-key 9, "Select", step 209, while being highlighted and the display 131 indicating a list of the distortion profiles 132–135 is shown, step 205. The distortion profile to be erased is highlighted with the navigation-key 10 and selected by pressing left soft-key 9, step 210. A confirmation display appears, step 211, (not shown) so that the user can confirm that the distortion profile should be erased from the phonebook entry 140. After confirmation is selected the distortion profile is erased and the terminal 1 brought back to display 136, step 212. The third option 139, "Rename", is used to rename distortion profiles. It is activated by pressing the left soft-key 9, "Select", step 213, while being highlighted and the display 131 indicating a list of the distortion profiles 132–135 is shown, step 205. The distortion profile to be renamed is highlighted with the navigation-key 10 and selected by pressing left soft-key 9, step 214. A display (not shown) for renaming the distortion profile appears, step 215, where the alphanumeric keys 8 is used to enter new letters, the right soft-key 9 to erase letters and the left soft-key 9 to end the renaming of the distortion profile. After the renaming is ended the terminal is brought to display 136, step 216. Other options could be included in this menu like: fetch profile from WAP server, create profile, timed profiles etc.

Figure 10:
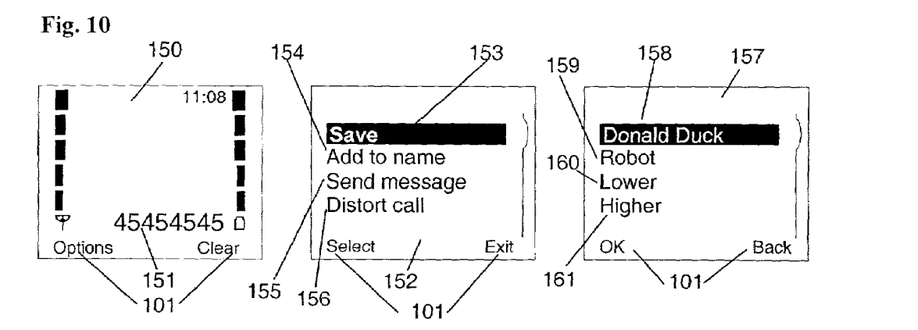

FIG. 10 displays are shown of how settings for a distortion profile for a single call can be set. The first display 150 shows how a user has entered a phone number 151, step 260, and that the indication 101 of the left and the right soft-key 9 has changed to "Options" and "Clear" respectively. The right soft-key 9, "Clear", is used to clear the entered phone number 151 or parts of the entered phone number 151. The left soft-key 9 is used to access a display 152, step 261, indicating a list of options 153–156 that can be used for the entered phone number 151. These options can be saved with the number in the phonebook 23, added to already existing entry in the phonebook 23, e.g., make a call, send SMS, use the number to calculate foreign currency etc. There is also the option 156, "Distort call", that is used to distort a single call. It can be executed by pressing the left soft-key 9 "Select", step 262, while the option 156 is highlighted. A display 157 appears, step 263, indicating a list of some available distortion profiles 158–161. There can be more distortion profiles, but they have not been shown for practical reasons. The other distortion profiles can be shown by scrolling up or down with the navigation-key 10. A preferred distortion profile is selected by scrolling up or down with the navigation-key 10 to highlight the preferred distortion profile and selecting it by pressing the left soft-key 9, "OK", step 265. By the execution of the preferred distortion profile the call set-up is also initiated according to the normal call set-up process, step 270. The communication terminal can also be set so that the default distortion profile as described earlier can be automatically selected when selecting option 156, "Distort call", step 264, in display 152.

Figure 11:
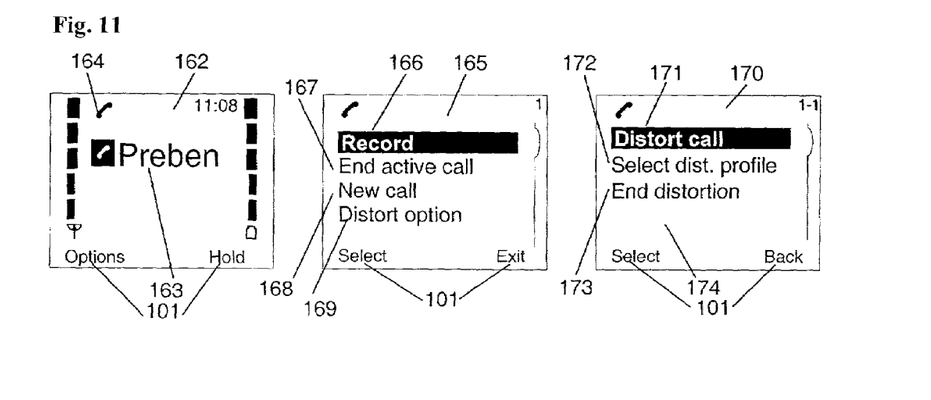
Figure 12:
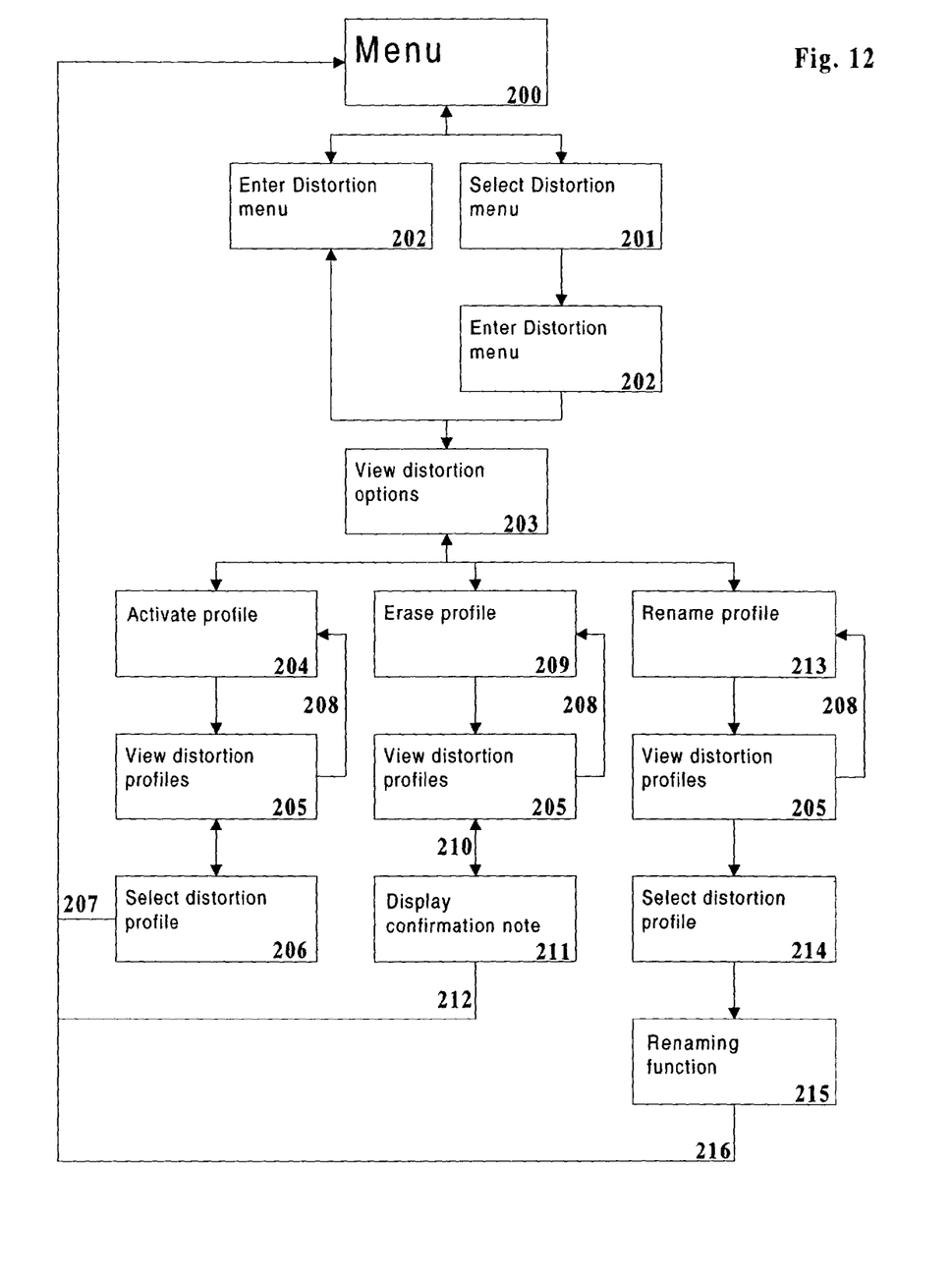
FIGS. 12–16 show flow charts of selective distortion of an acoustic signal according to the invention.
Figure 13:
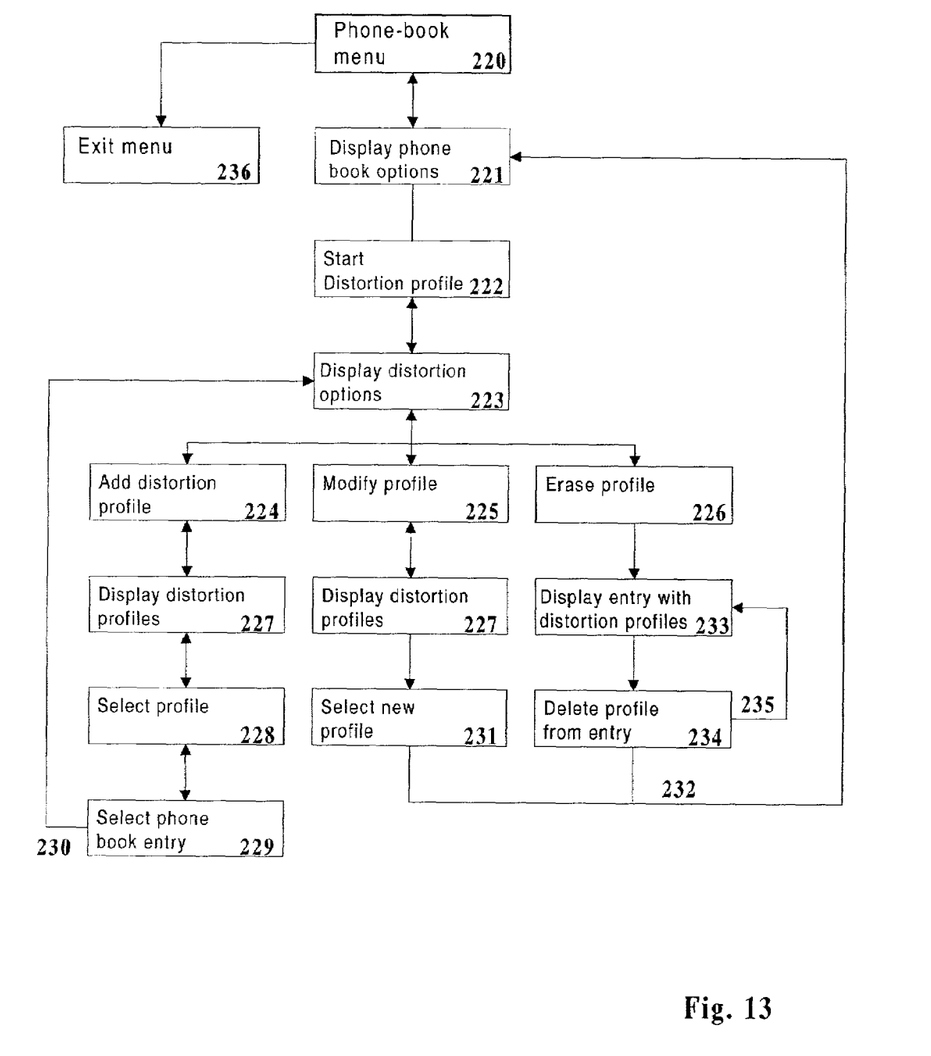
Figure 14:
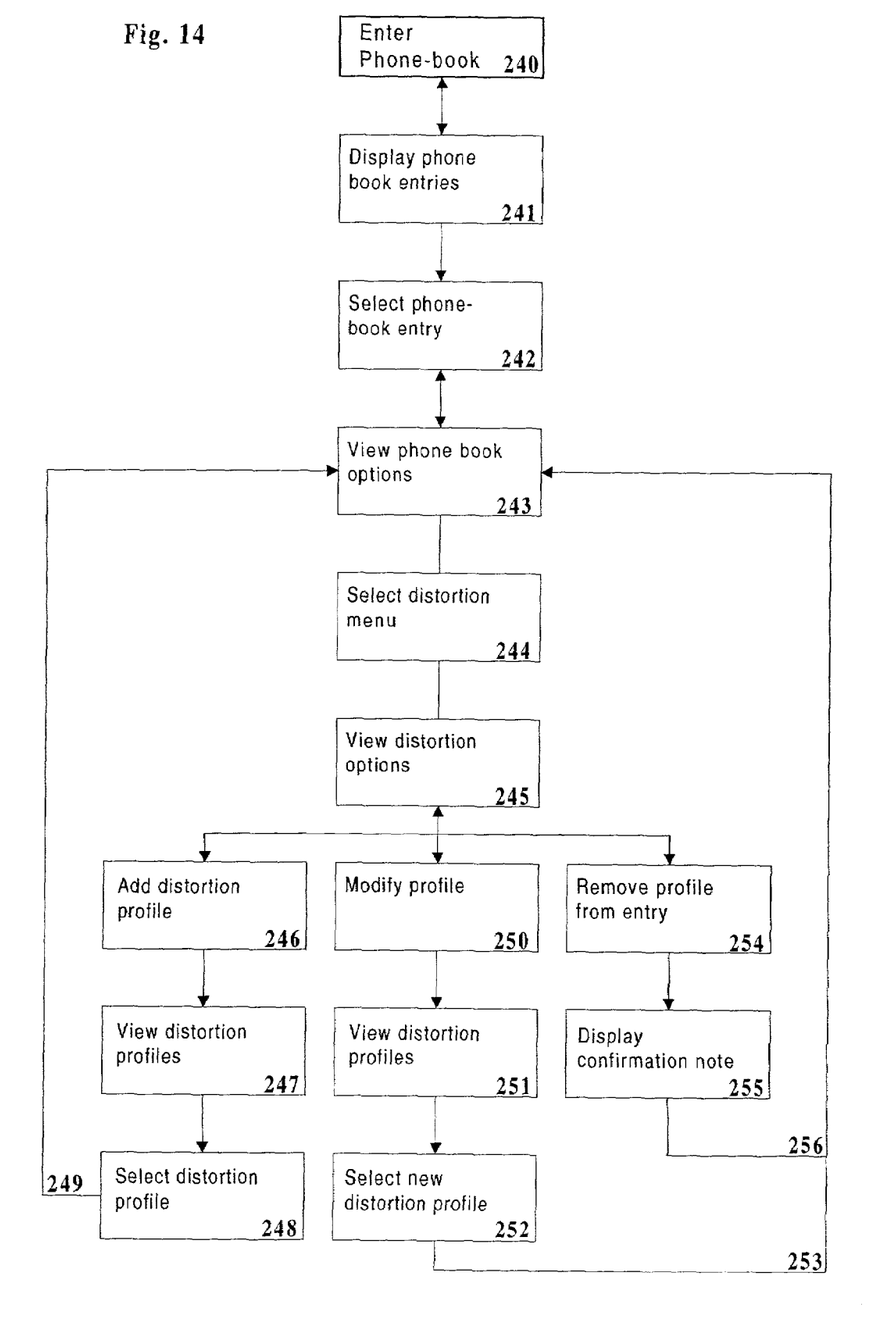
Figure 15:
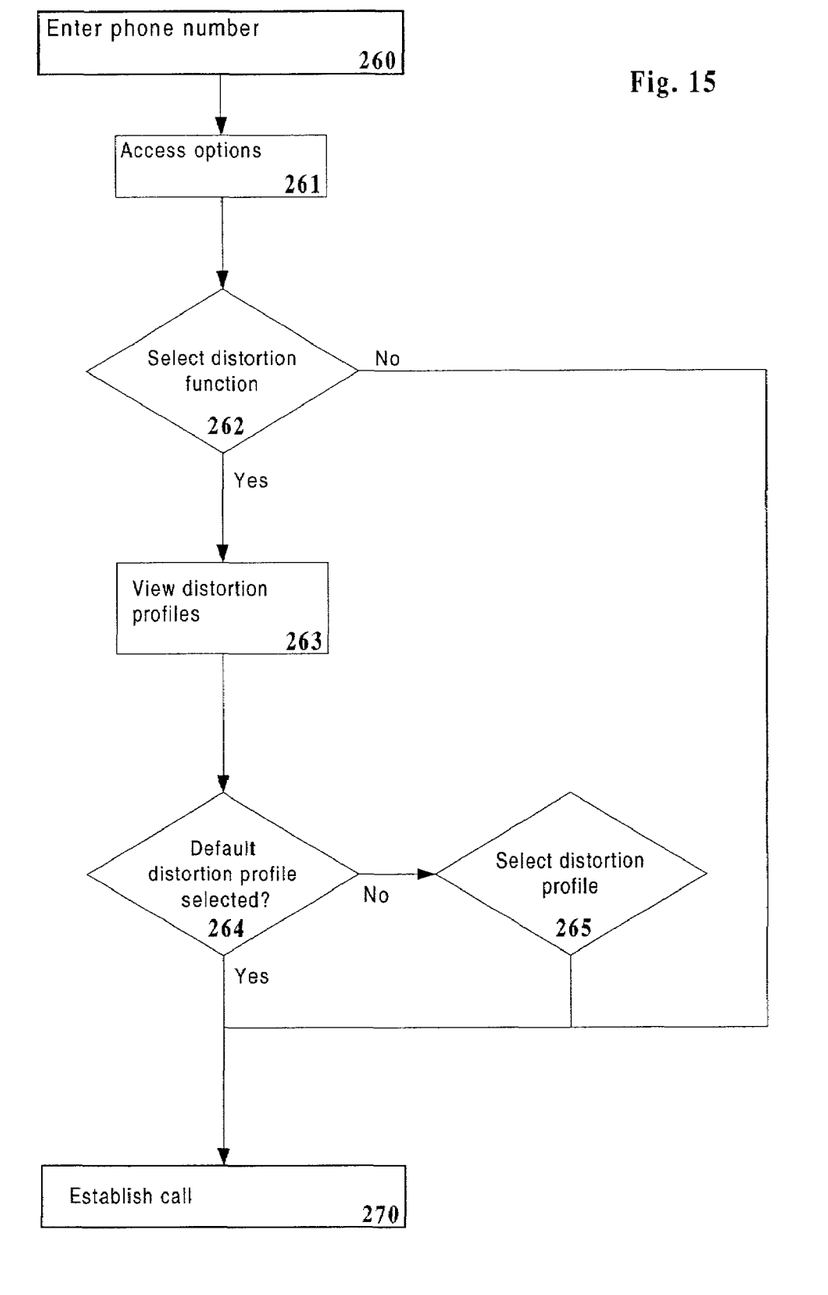
Figure 16:
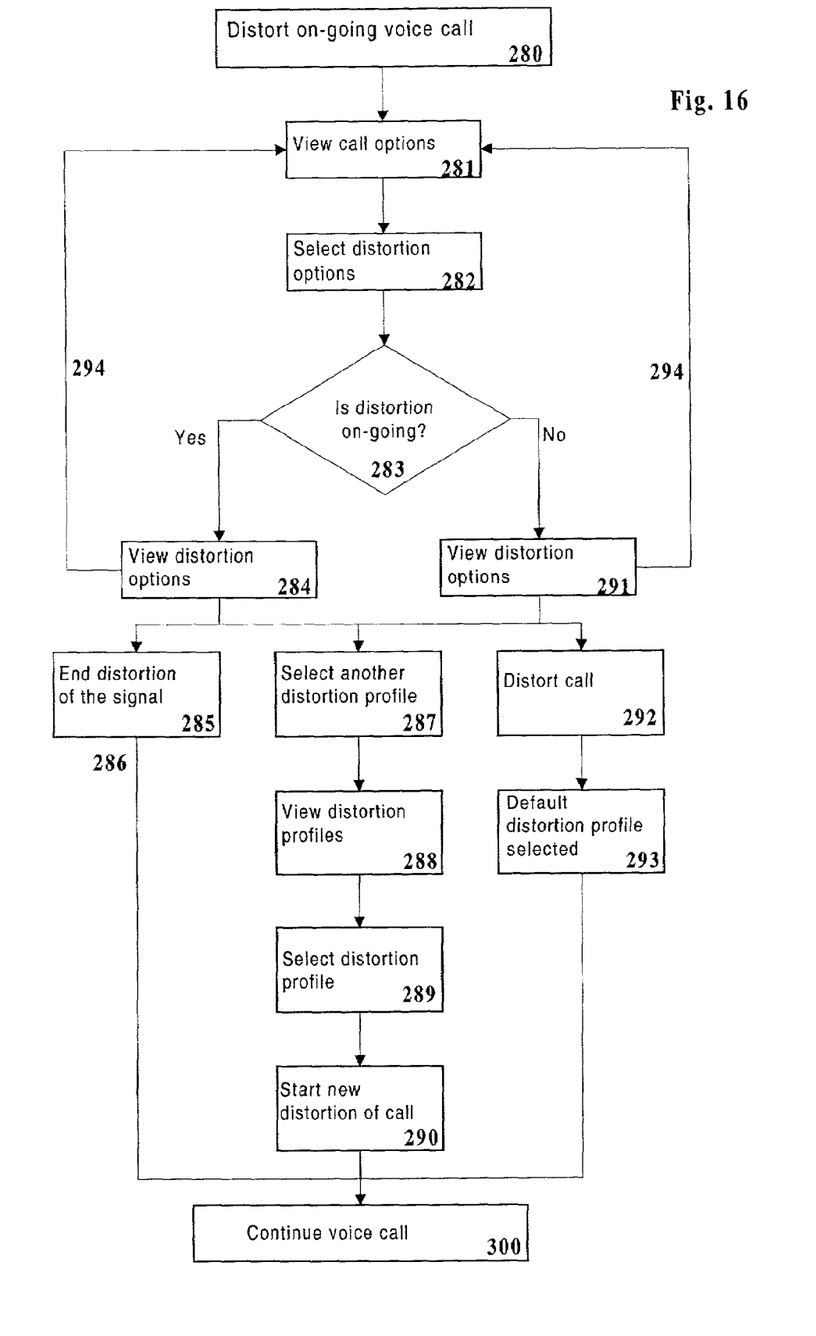

In FIG. 11 is shown displays of how distortion of a call can be started or ended during a call. A first display 162 indicates with a symbol 164 that a call is on-going, step 280 and with a header 163 the name of the called or calling party. The name of the called or calling party is only shown if the party is one of the entries in the phonebook 23. During a call different options can be executed, which can be accessed by pressing the left soft-key 9, "Options", and a display 165 appears, step 281, indicating a couple of options 166–169 that the user can select during an on-going call. If the distortion option 169 is selected by pressing the left soft-key 9, "Select", step 282, the terminal 1 checks, step 283, if a distortion is on-going. If a distortion of the call is on-going, a display 170 appears, step 284, indicating a list of distortion options 172–173. By executing the option 173 the distortion of the on-going call is ended, step 285, and the terminal is returns to display 162, step 286, and the voice call is continued step 300. The option 172, "Select dist. Profile", is used when the user of the communication terminal wants to select another distortion profile for the on-going call. It can be executed by pressing the left soft-key 9, "Select", step 287, while the option 172 is highlighted. A display 157 appears, step 288, indicating a list of some available distortion profiles 158–161. A preferred distortion profile is executed by scrolling up or down with the navigation-key 10 to highlight the preferred distortion profile and selecting it by pressing the left soft-key 9, "OK", step 289. After the execution of the preferred distortion profile, the new distortion is started and the terminal is returns to display 162, step 290, and the voice call is continued, step 300.

If a distortion of the call is not on-going a display 170 appears, step 291, indicating a list of distortion options 171–172. The option 171, "Distort call", is used to start distortion, step 292, of the on-going call using the default distortion profile, step 293. It is executed by pressing the left soft-key 9, "Select", when option 171 is highlighted (as shown in display 170). After the left soft-key 9 is pressed the distortion of the call is started and the terminal returns to display 162 and the voice call is continued, step 300. The option 172, "Select dist. Profile", is used when the user of the communication terminal wants to select a specific distortion profile for the on-going call. It can be executed by pressing the left soft-key 9, "Select", step 287, while the option 172 is highlighted. A display 157 appears, step 288, indicating a list of some available distortion profiles 158–161. A preferred distortion profile is executed by scrolling up or down with the navigation-key 10 to highlight the preferred distortion profile and selecting it by pressing the left soft-key 9, "OK", Step 289. After the execution of the preferred distortion profile, the distortion is started, step 290, and the terminal returns to display 162 and the voice call is continued, step 300. If instead the right soft-key 9, "Back", is pressed while in display 170, the terminal returns to display 165, step 294.

The distortion profiles are preferably included into the software of the communication terminal. They could either be standard profiles that are included in the software delivered from the factory or profiles that can be downloaded to the communication terminal in after delivery from the factory. The downloaded profiles can possibly be created by the user with certain software available on the Internet or software provided by the communicator manufacturer.

The invention has been described as been as being a part of the software in the communication terminal, but it should be noted that the distortion profiles could also be located in the network. From liability point it could be advantageous to locate the distortion profiles in the network, since users that do not want to be exposed to distortion making the calling unrecognisable can select a reverse distortion as default.

The invention is not limited to the above-described examples or to the drawings showing examples of an embodiment, but can be varied within the scope of the appended claims.

What is claimed is:

1. A method of distorting an acoustic signal comprising:
selectively distorting the acoustic signal input by a user of a first mobile communication terminal in accordance with a distortion profile to provide a distorted acoustic signal transmitted from the first terminal to a second terminal during a call with a user of the second communication terminal; and
wherein the first communication terminal includes a phonebook containing a plurality of selectable options including a distortion profile selection option permitting selection from a plurality of distortion profiles including the distortion profile used to provide the distorted acoustic signal; and wherein
a user of the first mobile communication terminal selects the distortion profile for each person in a phonebook of the communication terminal.

2. A method according to claim 1, wherein distortion of the acoustic signal is provided by an analog signal processor.

3. A method according to claim 1, wherein distortion of the acoustic signal is provided by a digital signal processor.

4. A method according to claim 1, wherein distortion of the acoustic signal is provided by a digital signal processor and the digital signal processor is separated from a digital signal processor performing speech coding of the acoustic signal.

5. A method according to claim 1, wherein a user of the first communication terminal selects the distortion profile from pre-defined distortion profiles.

6. A method according to claim 1, wherein a user of the first communication terminal selects the distortion profile for each call set-up.

7. A method according to claim 1, wherein a user of the first terminal selects the distortion profile during a call.

8. A method according to claim 1, wherein a user of the first terminal changes the distortion profile during a call.

9. A mobile communication terminal comprising:
an input interface and output interface;
means for distorting an acoustic signal input through the input interface and for output of a distorted acoustic signal through the output interface in accordance with a distortion profile; and
a user interface where the user can select distortion selections for specifying the distortion of the input acoustic signal from a phonebook including a plurality of selectable options including a distortion profile selection option permitting selection from a plurality of distortion profiles including the distortion profile used to provide the distorted acoustic signal; and wherein
the means for distorting includes a processor which distorts the acoustic signal inputted from a user of the mobile phone according to a user selection of the distortion profile selection option including the distortion profile in the communication terminal and the processor transmits the distorted acoustic signal for transmission to a second communication terminal and distortion of the acoustic signal is selected for each person in the phonebook of the communication terminal.

10. A communication terminal according to claim 9, wherein distortion of the acoustic signal is provided by an analog signal processor.

11. A communication terminal according to claim 9, wherein distortion of the acoustic signal is provided by a digital signal processor.

12. A communication terminal according to claim 9, wherein distortion of the acoustic signal is provided by a digital signal processor and the digital signal processor is separated from a digital signal processor providing speech coding of the distorted acoustic signal.

13. A communication terminal according to claim 9, wherein distortion of the acoustic signal is selected from distortion profiles.

14. A communication terminal according to claim 9, wherein distortion of the acoustic signal is selected for each call set-up.

15. A communication terminal according to claim 9, wherein distortion of the acoustic signal can be selected during a call.

16. A communication terminal according to claim 9, wherein distortion of the acoustic signal is changed during a call.

* * * * *